UNITED STATES PATENT OFFICE.

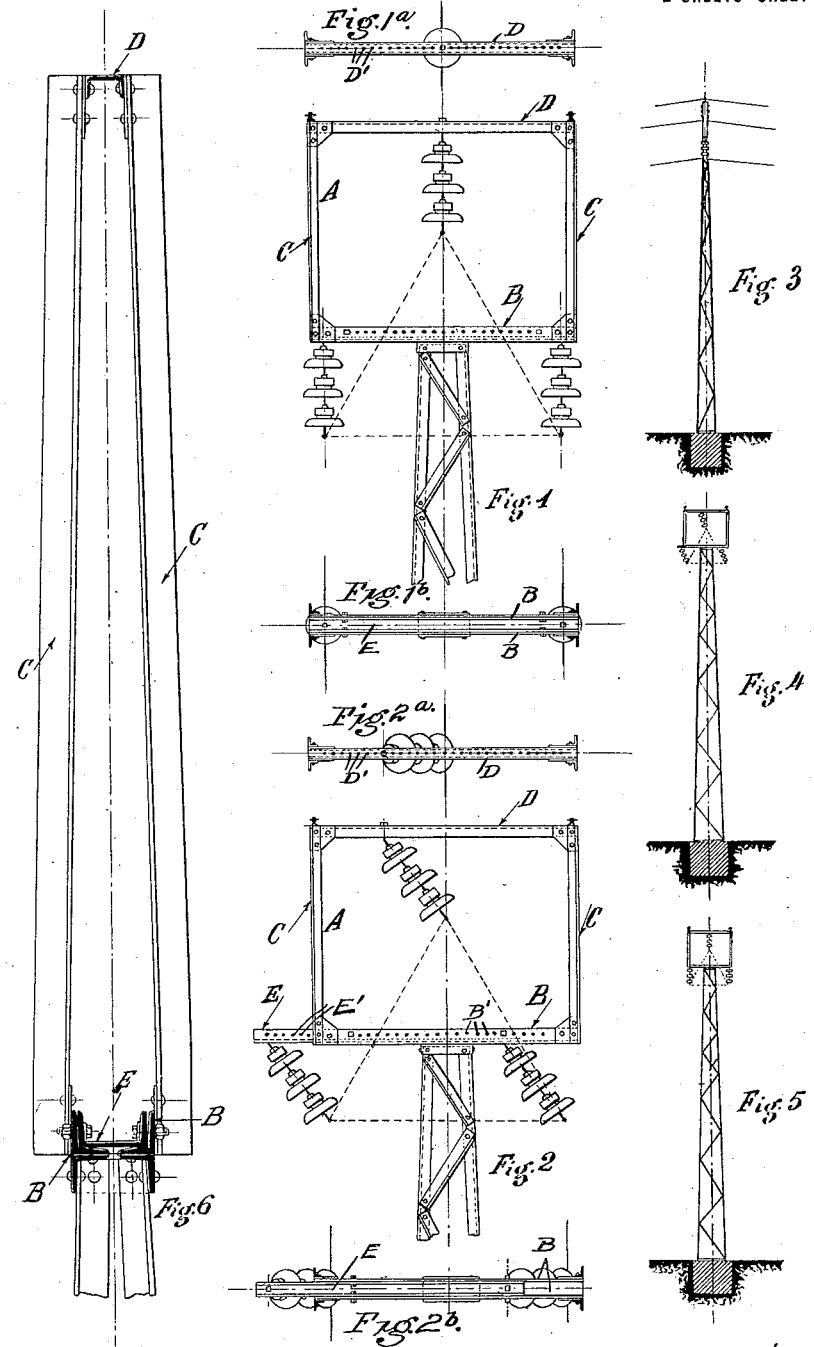

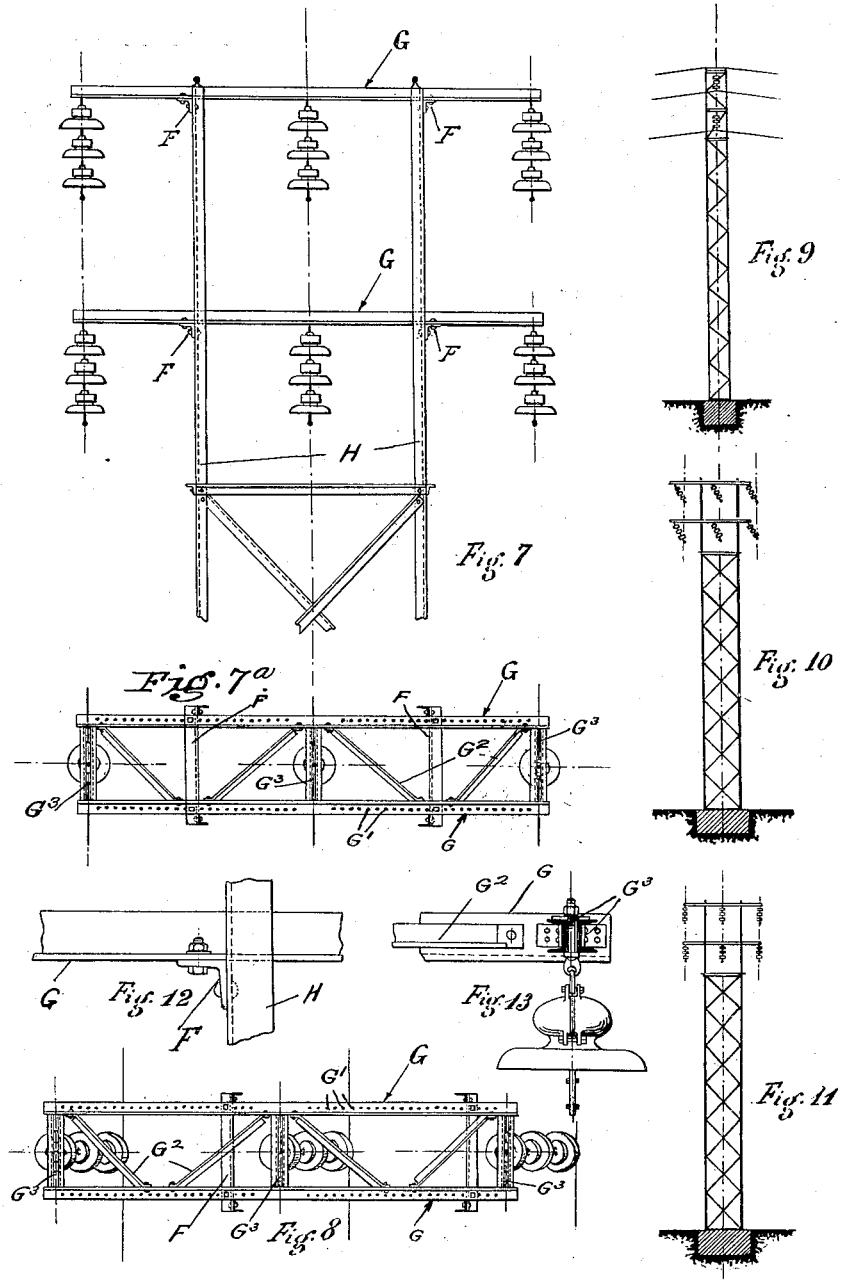

GIUSEPPE DOMENICO CANGIA, OF NAPLES, ITALY.

ELECTRIC-POWER-TRANSMISSION POLE.

1,139,487.     Specification of Letters Patent.     Patented May 18, 1915.

Application filed August 27, 1913. Serial No. 786,993.

*To all whom it may concern:*

Be it known that I, GIUSEPPE DOMENICO CANGIA, a subject of the King of Italy, residing at Naples, Kingdom of Italy, have invented certain new and useful Improvements in Electric-Power-Transmission Poles, of which the following is a specification.

The present invention has reference to insulators of the so-called "suspension" type, and it proposes, briefly, an improved mounting therefor which has been designed with a view to complete avoidance of the objectionable features ordinarily involved.

These insulators consist of separate insulating bodies connected to depending chains which are hung from a supporting frame, and, as is generally understood, they have only recently been introduced into practice in the construction of electric power-transmission lines. Their installation entails, however, the consideration of certain theoretical and practical problems which are not involved in the case of fixed insulators, notably the prevention of excessive transverse oscillation of the chains, due to wind pressure or other cause, which might bring the conducting wires connected to the insulators so close to the metal parts of the frame or of the pole as to permit discharge of the current to the ground, and this is especially true in the case of branch line poles where the chains, owing to their deflection, are brought nearer to the metallic structures.

To obviate the danger just referred to, my invention contemplates a mounting which is applicable equally to straight line and to branch line poles and which permits the suspension of the insulators to be effected with the utmost facility, without recourse to poles specially constructed and arranged in conformity with the amplitude of the angles formed by the lines. This improved mounting is based upon the discovery, from actual tests, that the maximum amplitude of oscillation of the conducting wires and insulators is produced in straight lines where the insulator chain is vertical, and it results therefrom that the said insulator chain should be so arranged that in the inclined position which it assumes when standing still under ordinary atmospheric conditions, it will hold the wire at the same distance from the pole as in straight lines where the chain is vertical. Consequently, with a system of mounting which provides for the proper adjustments of the chains at special points on the line, the desired object is attained, since the same system will answer conditions at all of such points.

One way in which the invention may be carried out in practice is illustrated in the accompanying drawing, whereof:—

Figure 1 is a front elevation of the frame from which the insulators of a straight three-wire, power-transmission line are suspended, and a portion of the pole whereon said frame is mounted; Figs. 1ª and 1ᵇ are plan views of the top and bottom members, respectively, of the frame shown in Fig. 1, with their insulators; Fig. 2 is a view similar to Fig. 1, but showing the mounting of the insulators for a branch pole; Figs. 2ª and 2ᵇ are plan views of the top and bottom members, respectively, of the frame shown in Fig. 2, with their insulators; Fig. 3 is a side elevation of a straight-line pole equipped with the frame and insulators represented in Fig. 1; Fig. 4 is a front elevation of a branch pole equipped with the frame and insulators represented in Fig. 2; Fig. 5 is a front elevation of Fig. 3; Fig. 6 is an enlarged side elevation of Fig. 1, but with the insulators omitted; Fig. 7 is a front elevation of the frame from which the insulators of a straight, six-wire line are suspended, and a portion of the pole wherein the frame is mounted; Fig. 7ª is a plan view of Fig. 7; Fig. 8 is a plan view showing the insulators arranged for a branch pole; Fig. 9 is a side elevation of a straight-line pole equipped with the frame and insulators represented in Fig. 7; Fig. 10 is a front elevation of a branch pole equipped with the frame and insulators represented in Fig. 8; Fig. 11 is a front elevation of Fig. 9; and Figs. 12 and 13 are enlarged details of the construction of the frame and the mounting of the insulators, respectively.

Referring to said drawing, and more especially to Figs. 1 to 6 thereof, the frame A shown therein is mounted upon a metal pole of any desired character and consists, preferably, of top, bottom and side members, D, B, and C, C, respectively, which are connected together at their mutually-adjacent ends to form a rectangle, the bottom member resting upon and being secured to the top of the pole. Each side member C of this frame is composed of a pair of metal beams of angle-section, arranged opposite each other in spaced relation, while the top member D is constituted by a metal beam of channel section. The bottom member B likewise consists of a pair of metal beams of angle-section, but these beams, as shown in Fig. 6, are so disposed relative to each other as to unite in forming a channel beam, within which latter a second channel beam E is slidably fitted and guided.

The frame as a whole is disposed transversely of the line, as will be understood, and where it is used in connection with a straight line, the insulator chains are suspended in symmetrical relation, as represented in Fig. 1, the upper chain being attached to the central portion of the top beam D, and the two lower chains to the ends of beam E. To provide for the adjustment of the chains, the body portion or base of beam D is formed with a longitudinal series of perforations D', shown in Figs. 1ª and 2ª, with which the hook or the like at the upper end of the chain is interchangeably engaged, while for a similar purpose the side walls of the beams B and E are provided with registering series of perforations B' and E', (Fig. 2).

In consequence, it will be apparent that the beam E, by reason of its sliding fit between the beams B, can be moved endwise in either direction to any desired extent, and then secured in adjusted position by the passage of one or more bolts through the pairs of registering perforations B' and E', thereby disposing the three chains at the required inclination, the adjustment of the upper chain with respect to beam D being made either previously or subsequently to that of the lower chains. Provision is thus made for positioning the chains in accordance with existing conditions at any point of the line and with both straight-line and branch-line poles, and since both the poles and the frames may be manufactured in stock sizes, no specially constructed parts are needed.

Where the invention is to be applied to a six-wire line, as in Figs. 7 to 13, the same principles are involved, but in this case the frame has a slightly different form, its chain-carrying members being constructed of two superposed pairs of horizontal beams G which are adjustably supported upon pairs of horizontal cross-beams F that are fastened to the pairs of vertical beams H in any suitable manner. The beams G are connected by braces G², and their horizontal wing portions are formed with longitudinal series of perforations G' to permit their adjustable connection to the cross-beams F. The chains themselves are directly attached to cross-beams G³ which connect the pairs of beams G at their ends and centers, as shown in Figs. 7ª and 8. It is to be noted that the upper cross-beams F with the upper bars G serve as the top member of the frame, in this form of the invention, and the lower cross-beams F as the bottom member thereof, the sides being constituted by the vertical beams H, and also, that the portions of this frame to which the chains are secured, (i. e. the cross-beams G³), are of two-part construction, the hooks or the like devices passing through the spaces between such parts, (Fig. 13), in the same way as through the spaces between the pairs of beams E in the first form.

I claim:—

1. Electric power-transmission means comprising, in combination, a pole; a frame mounted on the top thereof and consisting of connected top, bottom and side members, a sliding member mounted upon the bottom member, and means for retaining said sliding member in adjusted position; and suspension-type insulators with chains, at least one of said insulators having its chain connected to said top member and another of said insulators having its chain connected to said sliding member.

2. A frame for suspension-type insulators for electric power-transmission lines comprising connected top, bottom and side members, the bottom member being provided with perforations, an endwise-movable member slidably mounted upon said bottom member and formed with longitudinally-arranged perforations adapted for interchangeable registration with the first-named perforations; and fastening means engaged with said registering perforations to retain said sliding member in adjusted position, the said sliding member and the top member being adapted to support the insulator chains.

3. A frame for suspension-type insulators for electric power-transmission lines comprising horizontal top and bottom members, and vertical side members connecting the same; a horizontal member slidably mounted and guided upon the bottom member; and means for retaining said sliding member in adjusted position, the said sliding member and the top member being adapted to support the insulator chains.

In testimony whereof I affix my signature in presence of two witnesses.

GIUSEPPE DOMENICO CANGIA.

Witnesses:
 WILLIAM GARZINLO,
 INCOLA GUONIO.